United States Patent [19]
Tomonaga

[11] 3,879,226
[45] Apr. 22, 1975

[54] NOVEL STRUCTURE OF ELECTRODE IN A PRIMARY BATTERY FOR UTILIZATION OF LIQUID OR GASEOUS ELECTRODE ACTIVE MATERIAL

[75] Inventor: Atsushi Tomonaga, Tokyo, Japan

[73] Assignees: Kureka Kagaku Kogyo Kabushiki Kaisha, Tokyo; Toyo Boseki Kabushiki Kaisha, Osaka, both of Japan

[22] Filed: Mar. 27, 1974

[21] Appl. No.: 455,096

[30] Foreign Application Priority Data
Mar. 27, 1973  Japan.................. 48-34889

[52] U.S. Cl............................. 136/100 R; 136/121
[51] Int. Cl. ............................................. H01m 17/00
[58] Field of Search ....... 136/22, 20, 121, 122, 120, 136/100, 134

[56] References Cited
UNITED STATES PATENTS
| | | | |
|---|---|---|---|
| 3,549,423 | 12/1970 | Grubb et al.......................... | 136/120 |
| 3,786,134 | 1/1974 | Amagi et al. ....................... | 423/449 |
| 3,810,789 | 5/1974 | Vermeulen et al................ | 136/6 LN |

*Primary Examiner*—Howard S. Williams
*Assistant Examiner*—C. F. LeFevour
*Attorney, Agent, or Firm*—Sughrue, Rothwell, Mion, Zinn & Macpeak

[57] ABSTRACT

A primary battery comprising a current collector semipermeable carbon hollow microspheres with a particle size of about 10 to 500 microns and a wall thickness of about 2 to 10 microns having filled therein an electrode active material for the battery, the carbon hollow microspheres having the enough size of pore that a fluid can pass therethrough.

8 Claims, 4 Drawing Figures

NOVEL STRUCTURE OF ELECTRODE IN A PRIMARY BATTERY FOR UTILIZATION OF LIQUID OR GASEOUS ELECTRODE ACTIVE MATERIAL

BACKGROUND OF THE INVENTION

1. FIELD OF THE INVENTION

This invention relates to a novel primary battery, and particularly to a structure of an electrode for such a cell. More particularly, the present invention relates to a primary cell having a novel electrode structure in which the main component of the cell comprises semipermeable carbon hollow microspheres with a very small particle size, filled with an electrode active material for the cell electrode, these hollow microspheres acting as a current collector, and simultaneously serving as a capsule for the electrode active material and a reaction surface.

2. DESCRIPTION OF THE PRIOR ART

Generally, there are three components of a cell electrode. That is, these components are an electrode active material, an electrolyte and a current collector. It is necessary that these components should be in contact with one another. In a usual primary cell, this object has been accomplished by uniformly mixing a powdery active electrode material and a current collector with an electrolyte and molding or forming the mixture. The disadvantages of the described method are as follows.

1. When the electrode active material is nonconductive, the electrical resistance of the electrode increases with the increase in the amount of the nonconductive material used. At a result, the electromotive force is greatly decreased in a large current discharge operation.

2. When the active material is a liquid or is soluble in an electrolyte, the active material diffuses into the electrolyte, reaches an opposite electrode, reacts therewith and then is consumed therein, thereby decreasing the rate of utilization of the active material.

3. It is difficult to hold large amounts of the electrolyte in the cell, and the change in the chemical properties of the electrolyte is greatly affected due to the discharge reaction decreasing the utilization of the active material.

4. In utilizing a gaseous active material, since it is difficult to enclose it in a casing, it is impossible in practice to employ a gaseous active material.

Considering a primary cell using, as a cathode active material organic compounds which have been developed recently, sufficient performance is not exhibited due to the four reasons described above so long as powdery materials, such as carbon black which is usually employed as the collector, are utilized in spite of the fact that the theoretical current capacity is large in such compounds. As such organic compounds, nitro compounds, such as m-dinitrobenzene, quinones such as hydroquenone, amine compounds such as aniline, organic peroxides such as benzoyl peroxide, nitroso compounds, nitrogen-halogen compounds or the like can be used. However, all of these materials are nonconductive, and are more or less soluble in water. Some compounds are liquids at room temperature. Further, the property that the water of an electrolyte itself is consumed in the reaction process as a reactant is found in the discharge reaction of such compounds.

A typical example of these organic compounds is explained in greater detail. Where m-dinitrobenzene, for example, an aqueous solution of magnesium perchlorate or magnesium bromide as an electrolyte solution and magnesium, are used as a cathode active material, an electrolyte and an anode, respectively, the discharge reaction can be represented by the following reactions;

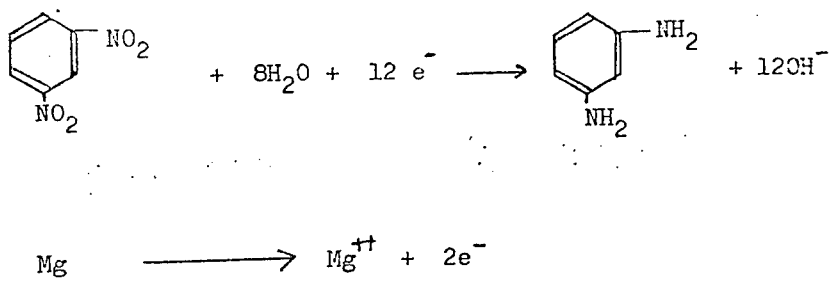

It will be apparent from this reaction that large amounts of electrolyte are required. In addition, since m-dinitrobenzene has a solubility of about 2 gr/liter in water at room temperature, the large current capacity (115 A min/g) of this material can not sufficiently be utilized in usual electrode structures. Further, m-dinitrobenzene is liquid at a temperature of above 89.9°C, it is difficult to utilize such a material at a high tempeature.

SUMMARY OF THE INVENTION

According to the present invention, a novel primary cell without the described disadvantages is provided. This invention provides a primary cell of a battery comprising a current collector of semipermeable carbon hollow microspheres having a particle size of about 10 to 500 microns and a wall thickness of about 2 to 10 microns and containing in the hollow microspheres an electrode active material for the battery the hollow microspheres having a porosity such that a fluid can pass there through.

BRIEF DESCRIPTION OF THE ACCOMPANYING DRAWINGS

FIG. 1 shows the structure of an electrode using carbon hollow microspheres with a minute particle size in accordance with the invention.

FIG. 2 a, b, c shows the relation between the decrease of the electromotive force and the passage of time in a m-dinitrobenzene/magnesium perchlorate/magnesium cell under the conditions of a 20Ω load discharge, a 100Ω load discharge and a 250Ω load discharge, respectively.

In the figures, 1 is carbon hollow microspheres with a minute particle size, 2 is an active material, 3 is an electrode, 4 is a collector terminal, 5 is a separator, and 6 is a counter electrode.

DETAILED DESCRIPTION OF THE INVENTION

In the invention, since the structure adopts as a collector semipermeable carbon microspheres each having a particle size of about 10 to 500 microns, preferably 75 to 250 microns, a wall thickness of about 2 to 10 microns, preferably 2 to 8 microns, and a porosity such that an electrolyte can pass therethrough, the electrolyte will be in contact with the active material at the pores of each carbon microsphere or at the surface thereof. Accordingly, that indispensable condition, i.e., the contact between the collector, the active material and the electrolyte, is satisfied. The concentration of the electrolyte generally ranges from 1 to 5 mol/l.

Figure 1:
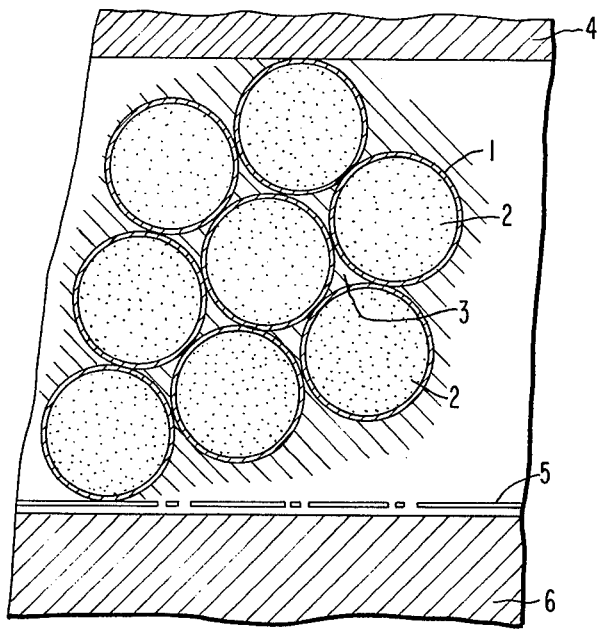

Referring now to the drawings in greater detail FIG. 1 shows an electrode structure of a primary cell in accordance with the invention, in which numeral 1 represents minute carbon hollow microspheres, 2 an active material, 3 an electrolyte, 4 a collector terminal, 5 a separator, and 6 a counter electrode. Since the active material is put into the hollow microspheres to form a capsule, the active material can be prevented from diffusing to the opposite electrode, and further it is possible to hold large amounts of electrolyte between the hollow microspheres. This prevents the utilization rate of the active material from decreasing due to the internal discharge which is caused by the diffusion of the active material. In addition, it follows from the presence of large amounts of the electrolyte that the chemical change of the electrolyte is substantially not affected due to the electrode reaction making the life of the cell battery longer. The amount of the active material can also be increased to about 60% by volume without increasing the electrical resistance of the electrode.

The semipermeable carbon hollow microspheres of minute particle size employed in the invention can be produced by the process as described in U.S. Pat. No. 3,786,134 which is herein incorporated by reference. Briefly after petroleum or coal pitch is mixed with a foaming agent, such as aromatic hydrocarbons, halogenated hydrocarbons, ethers, aliphatic and cycloaliphatic hydrocarbons, the mixture is dried and pulverized. The powdery material is then foamed to obtain hollow elements. Such elements are prepared by an infusion, and carbonized to produced carbon hollow microspheres. Thereafter, such hollow microspheres are immersed in mathanol under a vacuum. When the methanol permeates through the hollow microspheres, semipermeable microspheres may precipitate. These hollow shells are then selected to obtain the desired semipermeable carbon hollow microspheres. A suitable particle size and wall thickness of these microspheres which are used in this invention are as described above.

The following features of the primary cell showing the electrode structure in accordance with the invention. (1). A cell with increased life can be obtained. (2) It is possible to use a liquid or gaseous electrode active material. Particularly, a primary cell with a long service life using an organic active electrode material can be obtained according to the present invention, and the resulting effect is great advance in industry. The present invention is further illustrated by reference to the following example, but it is not to be constructed as limiting the scope of this invention. Unless otherwise indicated, all parts, percents and ratios are by weight.

EXAMPLE

Two different types of carbon hollow microspheres having a particle of 150 to 250 microns and a wall thickness of 2 to 8 microns; and a particle size of 75 to 150 microns, and a wall thickness of 2 to 8 microns respectively, prepared from pitch as a raw material were immersed in methanol in vacuo. The precipitated semipermeable carbon hollow microspheres wherein the hollow portion had been filled with methanol were separated and dried to obtain a current collector in each case. The following cells were assembled using each of the above current collectors and their properties were compared, using as a control a similar cell prepared from furnace black, (No. 30, made by Mitsubishi Chemical Industries, Ltd.) as a current collector. (1) After the carbon hollow microspheres were put into a container and the container was evacuated to a vacuum $10^{-1}$ mm Hg, m-dinitrobenzene in a molten state at temperature 130°C was introduced into the container and the pressure in the container was allowed gradually to increase to atmospheric pressure. The carbon hollow microspheres were washed with acetone and the precipitated microspheres were collector to obtain carbon hollow microspheres filled with m-dinitrobenzene. After drying the resulting carbon hollow microspheres, they were placed into a discharge cell in an amount sufficient to provide 0.371 g of m-dinitrobenzene in each cell. Thereafter, a vacuum was produced in the cell and a 2M aqueous solution of magnesium perchlorate was introduced into the cell to prepare a primary battery. In this case, magnesium having a purity of 99.9% and a filter paper were used as an anode and a separator, respectively. (2) Carbon black and a powder of m-dinitrobenzene were mixed and the resulting mixture was put into a discharge cell in an amount sufficient to provide 0.371g of m-dinitrobenzene in the cell followed by working up in the same manner as described above to prepare a cell.

The electrical properties of cells prepared from the two types of carbon hollow microspheres having different particle sizes were compared with those of cell using carbon black by measuring the voltage drop (Vi–V) with the lapse of time at a constant-resistance load (20Ω, 100Ω or 250Ω) at a temperature of 95°C, at which temperature the m-dinitrobenzene was a liquid.

Figure 2A:
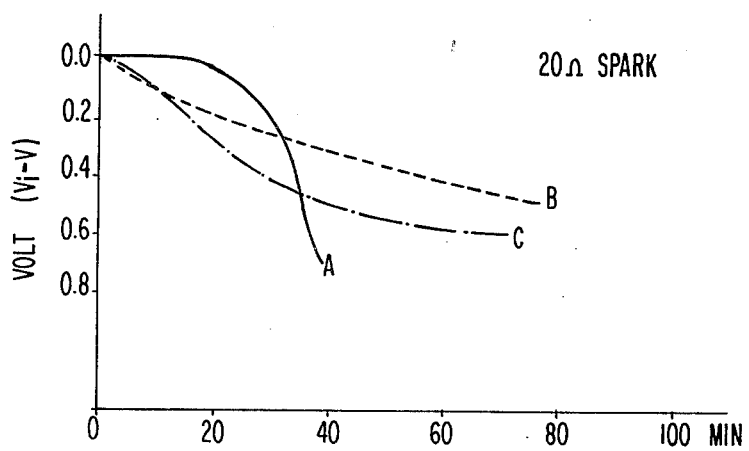
Figure 2B:
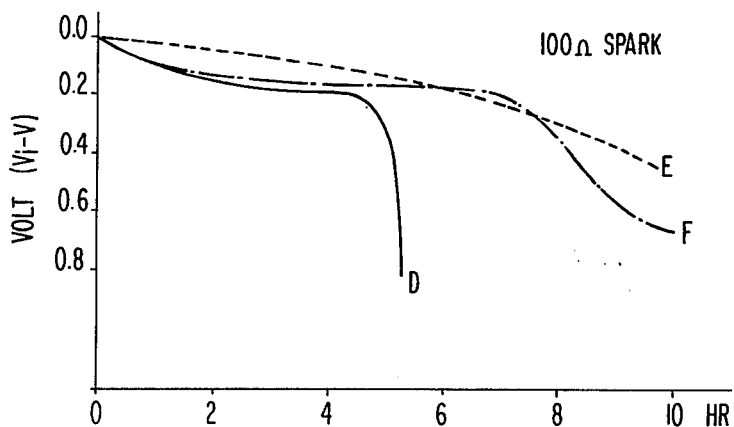
Figure 2C:
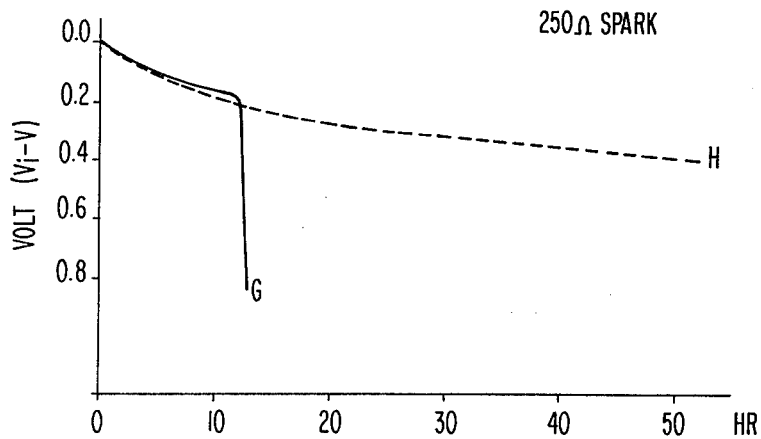

FIG. 2 illustrates the experimental results showing the relationship between the drop of the electromotive force and the time at the above load when battery is discharged. In FIG. 2, the symbols A, B, C, D, E, F, G and H correspond to Sample of the current collector plus m-dinitrobenzene. It will be apparent from FIG. 2 that the batteries in accordance with the invention have excellent properties.

Table

| Sample No. | Discharge Load (Ω) | Carbon Used as Current Collector | Weight of Current Collector and m-Dinitrobenzene (g) | Weight of m-Dinitrobenzen (g) | Initial Voltage Vi (V) |
|---|---|---|---|---|---|
| A | 20 | (a) | 0.542 | 0.361 | 1.04 |

Table —Continued

| Sample | Discharge Load | Carbon Used as Current Collector | Weight of Current Collector and m-Dinitrobenzene | Weight of m-Dinitrobenzen | Initial Voltage Vi |
|---|---|---|---|---|---|
| B | 20 | (b) | 0.500 | 0.361 | 0.90 |
| C | 20 | (c) | 0.596 | 0.361 | 1.05 |
| D | 100 | (a) | 0.542 | 0.361 | 1.20 |
| E | 100 | (b) | 0.500 | 0.361 | 1.19 |
| F | 100 | (c) | 0.596 | 0.361 | 1.15 |
| G | 250 | (a) | 0.542 | 0.361 | 1.23 |
| H | 250 | (b) | 0.500 | 0.361 | 1.23 |

(a): Furnace black No. 30 (made by Mitsubishi Chemical Industries, Ltd)
(b): Semipermeable carbon hollow microspheres with a particle size of 150 to 250 microns and a wall thickness of 2 to 8 microns, the hollow microspheres having pores such that liquid m-dinitrobenzene can permeate at the pressure difference of about 1 kg/cm$^2$.
(c): Semipermeable carbon hollow microspheres a particle in size of 75 to 150 microns and the same properties as those of (b).

What is claimed is:

1. A primary battery having an electrolyte and having an electrode comprising semipermeable carbon hollow microspheres with a particle size of about 10 to 500 microns and a wall thickness of about 2 to 10 microns and containing therein fluid electrode active material for the battery, the carbon hollow microspheres having a sufficient pore size that a fluid can pass therethrough.

2. The primary battery of claim 1, wherein said particle size ranges from 75 to 250 microns and said wall thickness ranges from 2 to 8 microns.

3. The primary battery of claim 1, wherein said electrode active material is liquid or gas.

4. The primary battery of claim 1, wherein said electrode active material is an organic compound in the liquid state.

5. The primary battery of claim 1, wherein said electrode active material is m-dinitrobenzene in the liquid state.

6. The primary battery of claim 1, wherein said electrolyte is a magnesium perchlorate or magnesium bromide aqueous solution.

7. The primary battery of claim 3, wherein the concentration of said electrolyte ranges from 1 to 5 mol/l.

8. The primary battery of claim 1, comprising a counter electrode of magnesium.

* * * * *